(12) United States Patent
Forys et al.

(10) Patent No.: US 8,392,928 B1
(45) Date of Patent: Mar. 5, 2013

(54) AUTOMATED WORKLOAD PLACEMENT RECOMMENDATIONS FOR A DATA CENTER

(75) Inventors: Jeffrey E. Forys, Cranbury, NJ (US); Latha Srinivasan, Glen Mills, PA (US); Jerome Rolia, Kanata (CA); Fernando Fraticelli, Toms River, NJ (US); Philip A. Vitale I, Freehold, NJ (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 936 days.

(21) Appl. No.: 12/259,837

(22) Filed: Oct. 28, 2008

(51) Int. Cl.
*G06F 9/46* (2006.01)
(52) U.S. Cl. ........................................ 718/104; 718/105
(58) Field of Classification Search .................. None
See application file for complete search history.

(56) References Cited

U.S. PATENT DOCUMENTS

| | | | |
|---|---|---|---|
| 7,146,353 | B2 | 12/2006 | Garg et al. |
| 2006/0259621 | A1 | 11/2006 | Ranganathan et al. |
| 2008/0163233 | A1* | 7/2008 | Kobayashi .................. 718/104 |
| 2009/0070771 | A1* | 3/2009 | Yuyitung et al. ............ 718/105 |
| 2009/0106571 | A1* | 4/2009 | Low et al. ................... 713/310 |

OTHER PUBLICATIONS

Gmach et al. "Workload Analysis and Demand Prediction of Enterprise Data Center Applications", 2007, IEEE, pp. 171-180.*

\* cited by examiner

*Primary Examiner* — Kenneth Tang (57) ABSTRACT

Automatically recommending workload placement in a data center. Historical data and workload constraints of a plurality of workloads are received. A plurality of resources of the data center available for placement of the plurality of workloads is identified. Resource constraints of the plurality of resources are received. Headroom ratings are assigned to the plurality of workloads based on the historical data, the workload constraints and the resource constraints. A consolidation recommendation of the plurality of workloads on the plurality of the resources in said the center is automatically generated based on an analysis of the historical data, the plurality of workloads, the plurality of available resources in the data center and the headroom ratings.

17 Claims, 7 Drawing Sheets

AUTOMATED WORKLOAD PLACEMENT RECOMMENDATIONS FOR A DATA CENTER

FIELD

Embodiments of the present technology relates generally to the field of computing.

BACKGROUND

Data centers are often used to provide a variety computing services for a variety of purposes (e.g., payroll, email server) requiring different applications and computing requirements. Data centers are usually made up of numerous servers that are configured and networked to accommodate various workloads. The various workloads are typically allocated on the servers by data center administrators. As the number of workloads increases, the number of servers to hold the workloads also increases. The increase in the number of servers also increases the burden and complexity to allocate the workloads on the servers. Likewise, as the number of servers increases so does the square footage of the data center and the power and cooling costs.

BRIEF DESCRIPTION OF THE DRAWINGS

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The term "data center" is generally meant to include any facility equipped to hold numerous amounts of computing resources. The resources include, but are not limited to, server computer systems. The servers of a data center may provide computational, storage, communication, or other computing services depending on the application needs and data center priorities. Application needs include, but are not limited to, memory, CPU, disk I/O and network I/O. The general application needs are described as "workloads" as referenced hereinafter.

In data centers, computing resources can be under-utilized. Administrators, who typically allocate workloads on servers, often over-provision resources to meet the objectives of the workloads. The use of the workloads may vary substantially which may also add to under-utilization. For example, a workload related to payroll may require a change of workload constraints to accommodate for larger computing capacity towards the end of the month and little to no capacity towards the beginning of the month. Likewise, a workload related to an email server may require a change of workload constraints to accommodate larger computing capacity during the week as compared to the weekend.

Resources in a data center may also be under-utilized due to the burden and complexity of allocating numerous workloads on numerous servers. Generally, a data center administrator may manually allocate a few workloads on a few number of servers with little burden and complexity. However, as the number of workloads and the necessary servers to place the workloads increases, the amount of combinations of workload placement on the servers may increase exponentially. The exponential increase of combinations of workload placement on servers, consequently, increases the burden and complexity of the administrator to place the workloads on the servers. Additionally, workload and server constraints may add to the burden and complexity of allocating workloads on servers. The under-utilization of resources increases square footage of the data center and increases the costs of powering and cooling the resources. Consequently, costs related to the data center may be reduced by efficiently allocating workloads on resources.

The automatic recommendation of workloads on resources in the data center allows administrators to plan for resource usage based on historical data gathered over time. The system administrators can automatically generate capacity planning information and thereby allowing them to create workload placements for large numbers of workloads and resources, which would be very complex if performed manually. Embodiments of the automatic recommendation technology also saves time and effort that is required to manually plan the placement of workloads on resources, while taking the workload and resource constraints into account. An embodiment of the technology allows for the specifying of placement strategies, such as, consolidation of a large number of systems or to distribute workloads more equitably among a set of resources.

In particular, embodiments of the automatic recommendation technology provides workload placement recommendations across computing resources based on historical utilization data and other constraints specified by the user. An embodiment of the technology saves significant effort during capacity planning phase, by eliminating the challenging manual steps of trying to find proper placement combinations for workloads on resources because it becomes impossible to manually generate correct placements for several different alternatives.

Also, energy and maintenance costs are driven down by providing the ability to consolidate large number of workloads onto fewer systems. It should be appreciated that "physical systems" already exist in the data center, while "what-if systems" are not physically present, but form part of the solution and would need to be added, in accordance with various embodiments.

Figure 1:
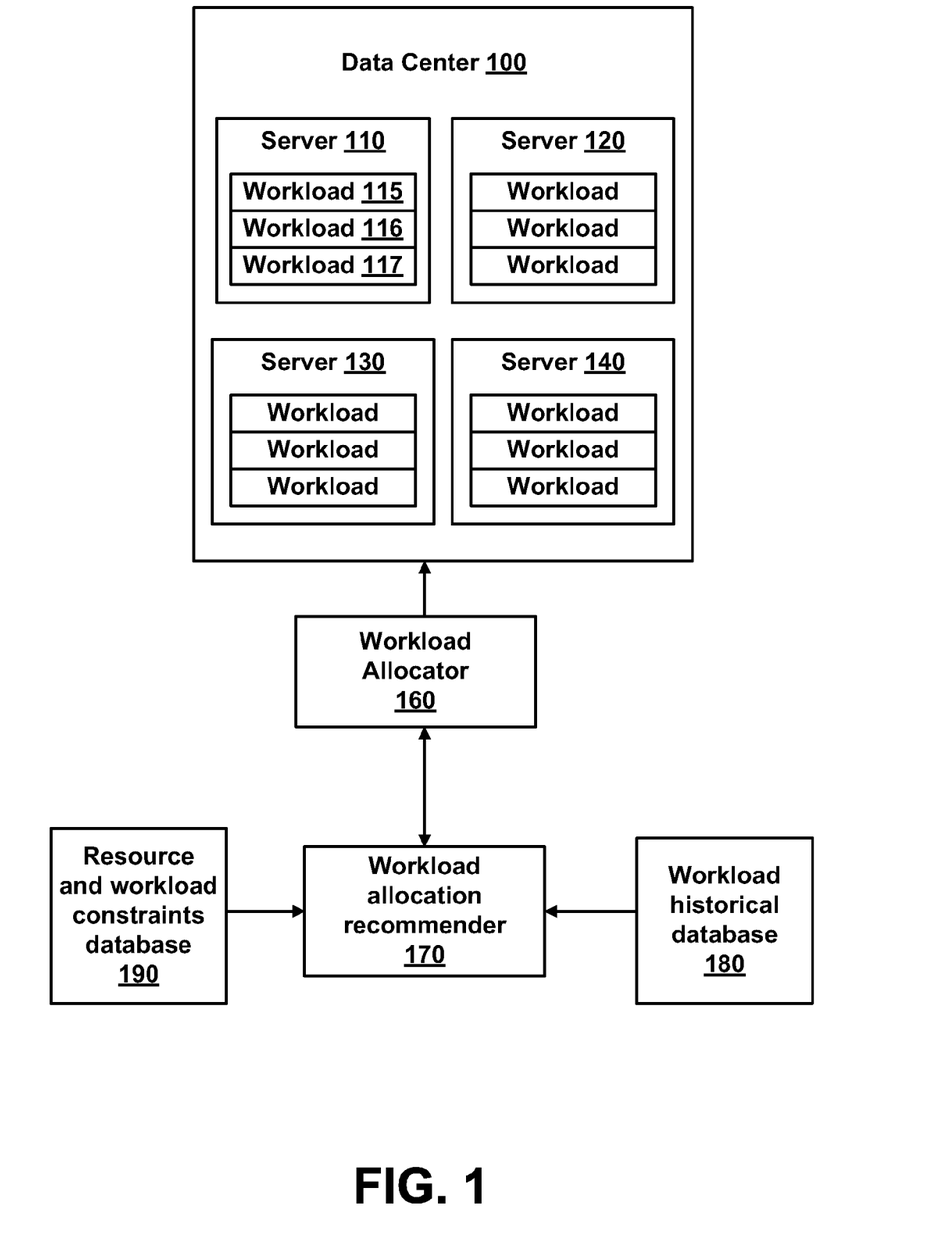
FIG. 1 illustrates an example of a data center having multiple servers with workloads placed on the servers, in accordance with an embodiment of the present invention.

FIG. 1 illustrates an embodiment of a data center 100 having multiple servers 110, 120, 130 and 140. Workloads 115-117 have been placed on server 110. A workload allocator 160 allocates workloads on the servers 110, 120, 130 and 140. It should be appreciated that the workload allocator 160 is controlled by a data center administrator, in accordance of one embodiment. In one embodiment, the data center 100 has one of a plurality of servers holding only one workload. In another embodiment, the data center has one of a plurality of servers having no workloads. In another embodiment, the data center 100 has a plurality of servers holding numerous workloads. For instance, in one embodiment, the data center 100 has a plurality of servers holding a single workload. For example, in another embodiment, the data center 100 has a plurality of servers holding no workloads.

In one embodiment, the allocator 160 provides a workload allocation recommendation by a workload allocation recommendation generator 170. The recommendation generator 170 receives workload historical data from a historical database 180 and receives workload and resource constraints from a workload and resource constraint database 190. In another embodiment, the recommendation generator 170 creates a recommendation only from historical data. In another embodiment, the workload allocation recommendation generator 170 makes a recommendation based on any combination of historical data, workload constraints and resource constraints.

In one embodiment, the workload constraints are determined by workload user(s). For instance, in one embodiment, the server and workload constraints can be, but not limited to, memory capacity, CPU capacity, network capacity or disk capacity. In another embodiment, the recommendation generator 170 receives workload constraints from workloads already placed on servers in the data center 100. In another embodiment, a user specified constraint is that the workloads are to be placed together. In another embodiment, a user specified constraint is that the workloads are to be placed apart from one another. In another embodiment, a user specified constraint is the simulation interval (e.g., representative time interval of utilization data). In one embodiment, a user specified constraint is that the resources are pre-existing. For example, in one embodiment, a user specified constraint is that the resources to be used are new template-generated systems where users are prompted for the resource capacity to be used. For example, in another embodiment, a user constraint is forecast growth-rate as a percentage, if projecting into the future. In one embodiment, a user specified constraint is that the workloads reside together. For instance, in one embodiment, a user specified constraint is that the workloads are placed apart. It should be appreciated that constraints are not limited to the aforementioned constraints. It should also be appreciated that a recommendation can use any combination of the aforementioned constraints.

The recommendation generator 170 uses a consolidation method, a balanced distribution method and a consolidation and load balancing method to recommend the allocation of workloads on resources, which are described below in FIGS. 2b, 3b, and 4b, respectively. In one embodiment, greedy-algorithm principles are used to construct a number of different placement solutions based on workload and resource constraints. In another embodiment, the number of candidate solutions can range between 10 and 100, and are based on the number of workloads and resources in the initial configuration. As the amount workloads and resources increases, the amount of candidate solutions also increases. As the potential solutions approaches a googol, a combination of constraints, historical data and headroom data are used to generate candidate solutions.

In one embodiment, before the allocation of workloads, a map is created that identifies the resources on which a workload can be placed, as well as a reverse map for each resource that identifies the workloads that can be placed on the resource. These maps are used to make just-in-time placement decisions, such as the immediate placement of any workload that is down to its final resource assignment as indicated by the workload and resource maps. In another embodiment, the workloads are selected at random, which reduces the chance that any one workload will be left with no valid resource assignment.

Figure 2A:
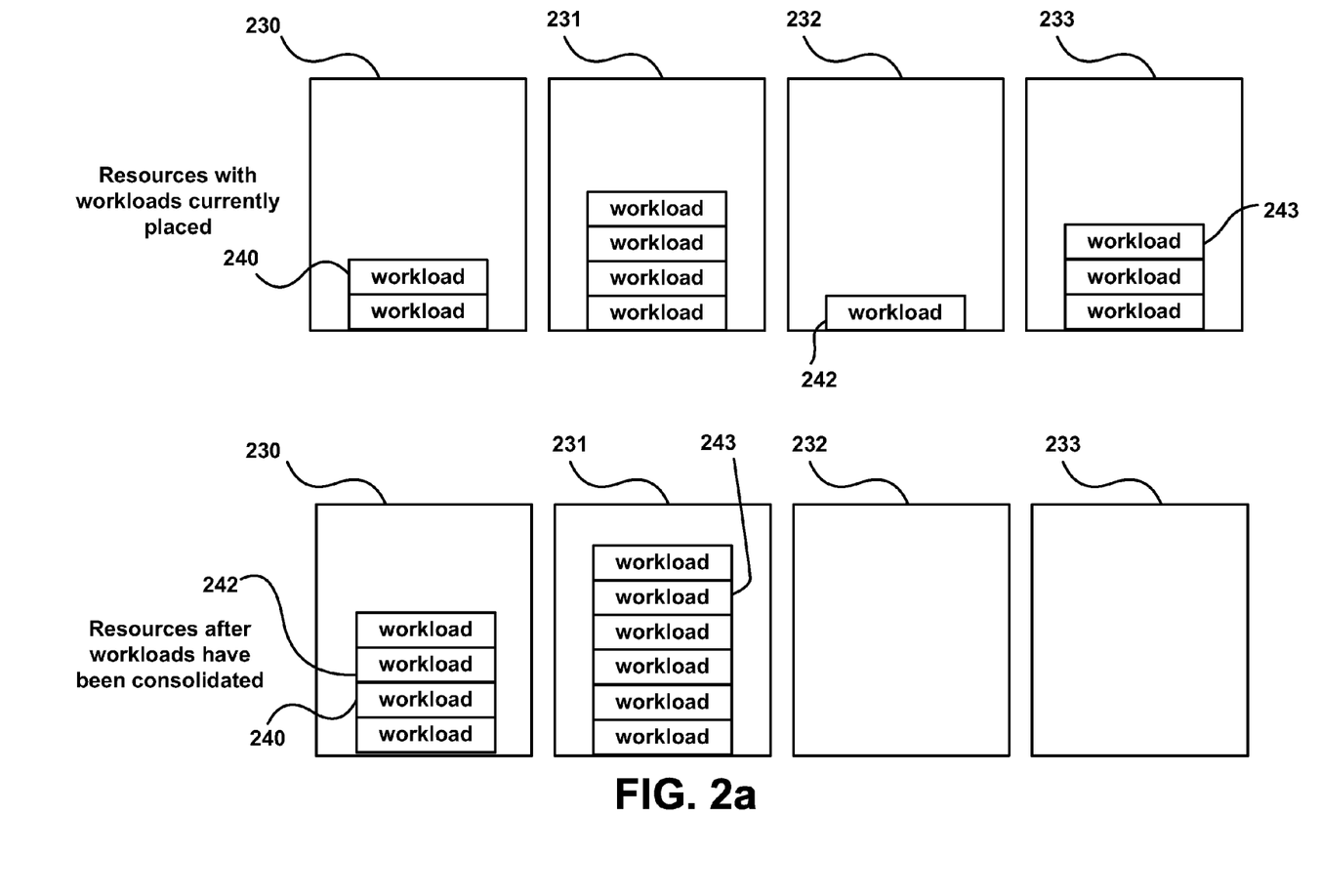
FIG. 2a illustrates an example consolidation workload placement recommendation, in accordance with an embodiment of the present invention.
Figure 2B:
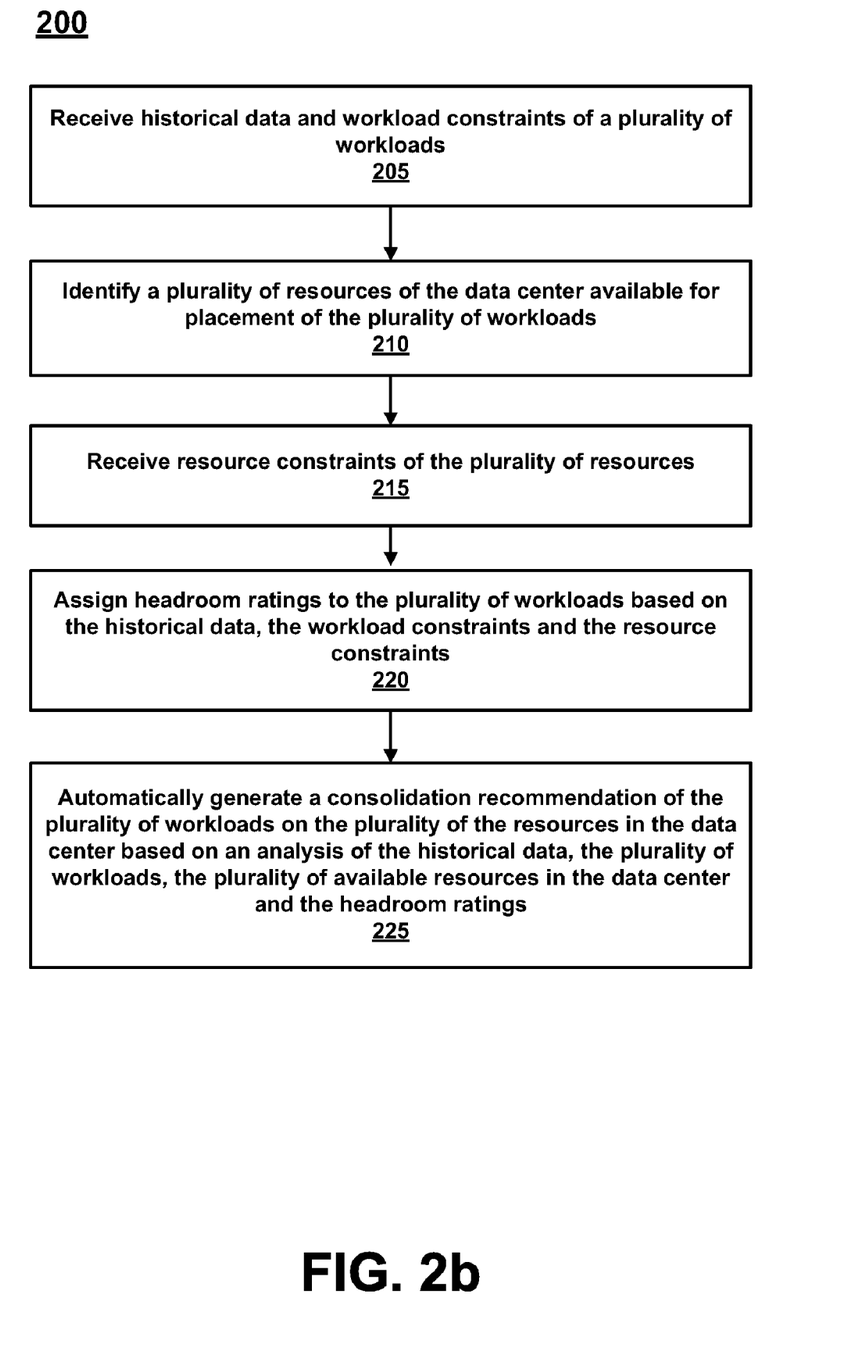
FIG. 2b illustrates a flowchart for automatically recommending consolidated workload placement in a data center, in accordance with an embodiment of the present invention.
Figure 3A:
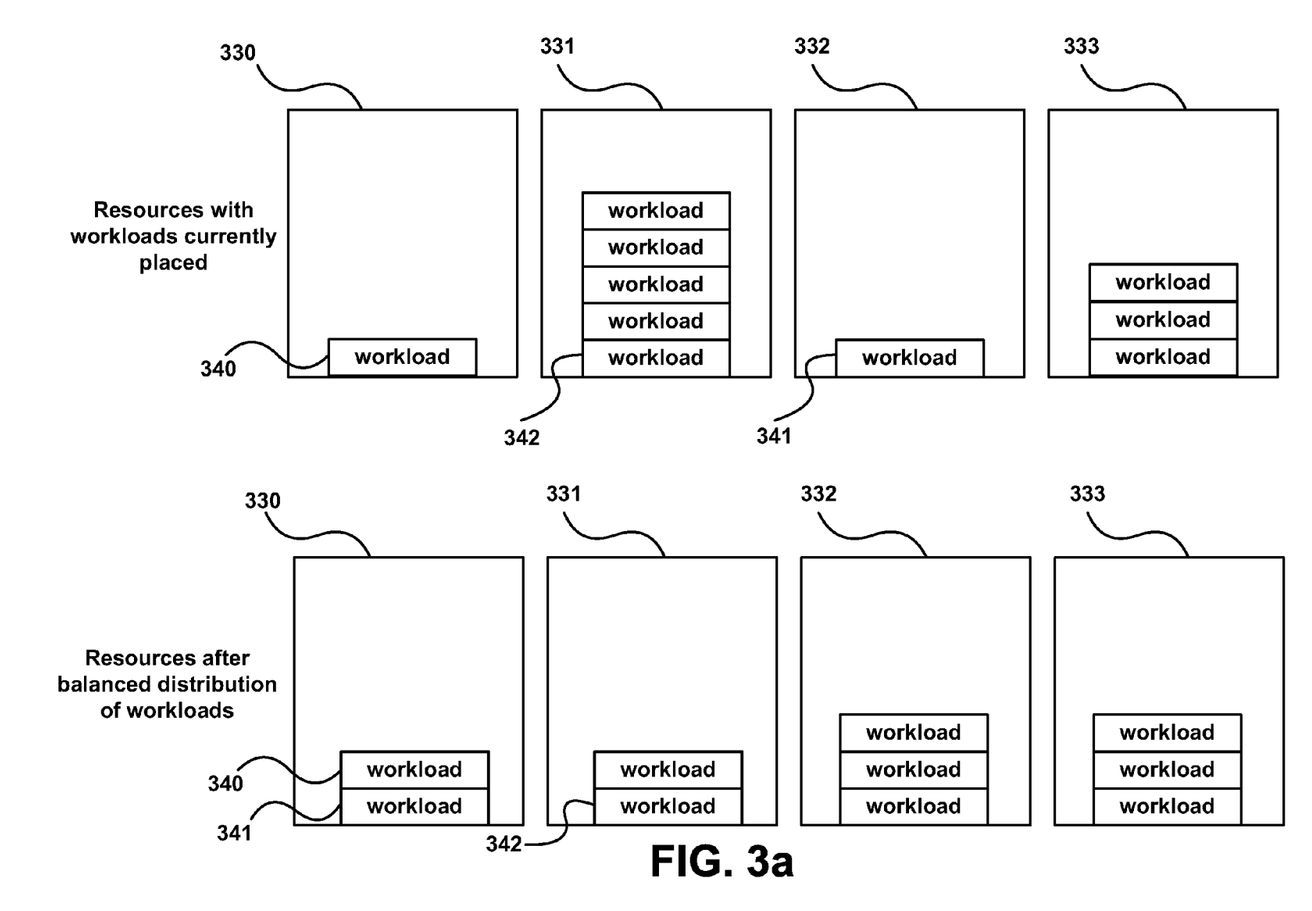
FIG. 3a illustrates an example load balanced workload placement recommendation, in accordance with an embodiment of the present invention.
Figure 4A:
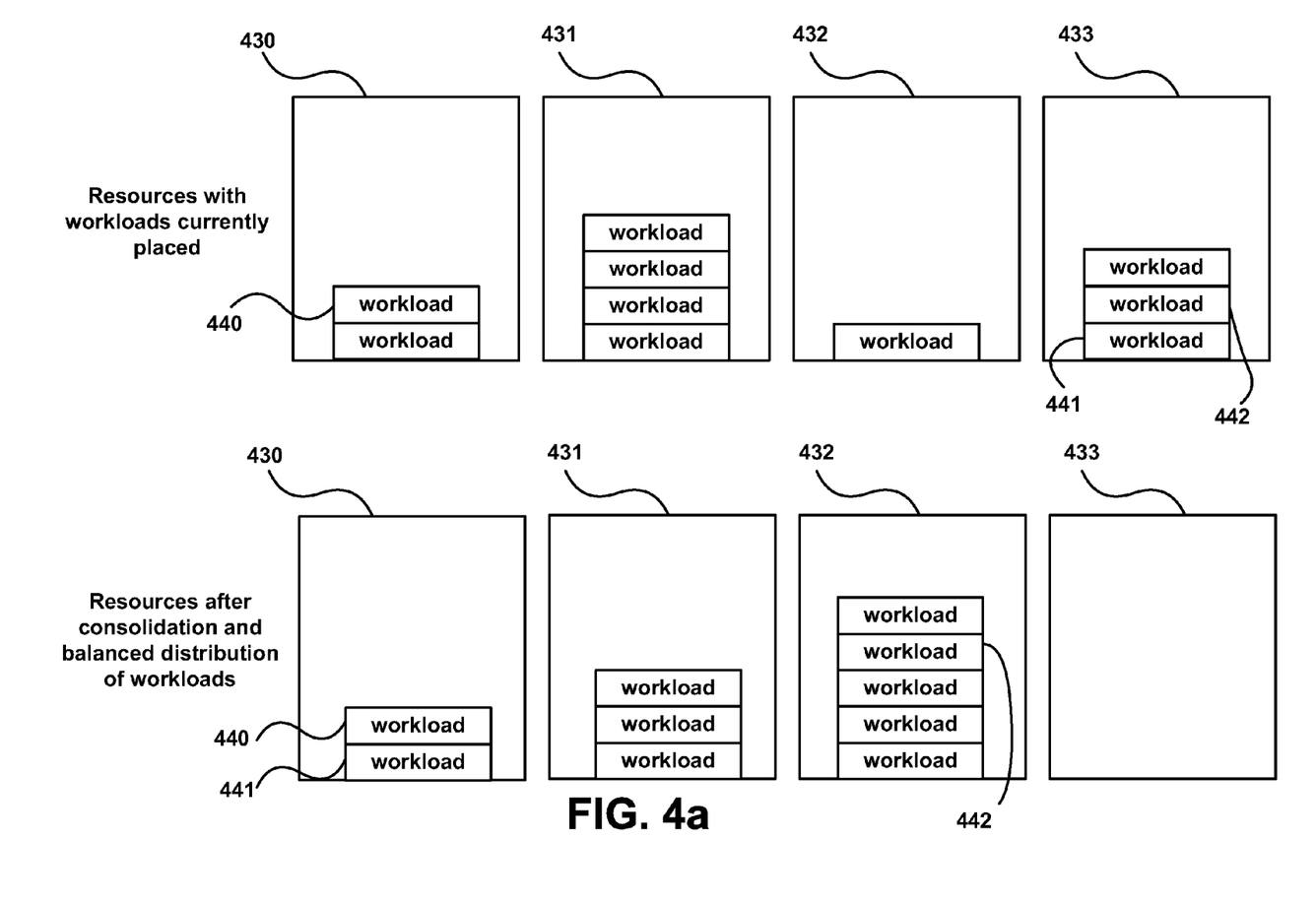
FIG. 4a illustrates an example consolidation and load balanced workload placement recommendation, in accordance with an embodiment of the present invention.

FIGS. 2a, 3a and 4a illustrate example workload placement recommendation, in accordance with various embodiments. FIG. 2a illustrates an embodiment of the consolidation of workloads on resources in a data center. The purpose of consolidating workloads on resources is to place as many workloads on as few resources as possible without violating any workload and/or resource constraints. The method of consolidation of workloads on resources is further explained in FIG. 2b.

FIG. 3a illustrates an embodiment of the load balancing of workloads on resources in a data center. The purpose of load balancing workloads on resources is to make the amount of available capacity on the resources after placement of the workloads to be substantially equal without violating or exceeding any workload or resource constraints. The method of balancing workloads on resources is further explained if FIG. 3b.

FIG. 4a illustrates an embodiment of the consolidation and load balancing of workloads on resources in a data center. The purpose of consolidation and load balancing of workloads on resources is to place as many workloads on as few resources as possible without violating any workload and/or resource constraints. After consolidation, the purpose of load balancing is to make the amount of available capacity on the resources after placement of the workloads to be substantially equal without violating or exceeding any workload or resource constraints. The method of consolidation and balancing workloads on resources is further explained if FIG. 4b.

FIG. 2b is a flowchart illustrating method 200 of automatically generating a consolidation recommendation for the placement of workloads in a data center. Although specific operations are disclosed in method 200, such steps are examples. That is, embodiments of the present invention are well-suited to performing various other operations or variations of the operations recited in method 200. The operations in method 200 may be performed in an order different than presented, and it is possible that not all of the operations in method 200 are performed. All of, or a portion of, the operations described by method 200 may be implemented using computer-readable and computer-executable instructions which reside, for example, in computer-usable media of a computer system. In one embodiment, process 200 is performed in a computer system, e.g., recommendation generator 170 of FIG. 1. It should be appreciated that various operations have been left out of the following discussion for purposes of brevity and clarity. The goal of consolidation is to place as many workloads into a few resources as possible, with the lowest cost and without violating any workload and/or resource constraints specified by the user(s).

At block 205, historical data and workload constraints of a plurality of workloads are received. In one embodiment, the historical data is used to forecast the growth rate of a workload.

At block 210, a plurality of resources are identified which are available for placement of the plurality of workloads. FIG. 2a illustrates one embodiment of the implementation of the consolidation recommendation of a plurality of workloads on a plurality of resources 230-233 located in a data center (not shown). The plurality of resources 230-233 are shown having workloads currently placed on the resources before consolidation of the already placed workloads. After implementation of the consolidation recommendation, resources 230-233 are shown with consolidated workloads on the resources.

In another embodiment of FIG. 2a, the workload and resource constraints can determine the consolidation of the workloads on the resources. The workload and resource constraints determine the headroom ratings, described below. For example, in one embodiment, workload 240 has a memory constraint of 15 GB and workload 242 has a memory constraint of 10 GB. Resource 230 has a memory constraint of 30 GB compared to 12 GB capacity constraints for resources 231-233. Only resource 230 is available to hold resources 240 and 242 when the workloads are consolidated. Similarly, workload 243 has a CPU constraint that is larger than the CPU constraint of resource 230, therefore workload 243 could not be placed on resource 230 because the CPU constraint would exceed and violate the resource constraint of resource 230. Thus, workload 243 is consolidated on resource 231 because the CPU constraint of workload 243 is less than the CPU constraint of resource 231. Workload 243 could be placed on resource 232, but this would result in less consolidation of workloads compared to being placed on resource 231. In another embodiment, if the CPU constraint of workload 243 exceeded the CPU constraints of resources 230-232, workload 243 would remain in resource 233 because it does not violate the CPU constraint of resource 233.

At block 215, resource constraints of the plurality of resources are received. In one embodiment, the resources are homogenous. In another embodiment, the resources are heterogeneous. For instance, in one embodiment, the resources are physical servers. In one embodiment, the resources are template-based what-if systems. For example, in another embodiment, servers are converted into virtual machines with using existing virtual machine hosts. In one embodiment, servers are converted into virtual machines without using existing virtual machine hosts.

At block 220, headroom ratings are assigned to a plurality of workloads based on the received historical data, workload constraints and resource constraints. The headroom ratings describe the robustness of the workloads and resources. In other words, the ratings describe how much more room is available for workloads to grow on given resources.

For example, if a workload barely fits on a resource, then the workload would be assigned an appropriate low headroom rating, such as "1." On the other hand, if a workload can easy double its capacity regarding all of the workload constraints and still fit on a resource, then the workload would be assigned an appropriate higher headroom rating, such as "5." Likewise, a workload that can expand approximately 75% on a resource is assigned an appropriate rating, such as "4." A workload that can expand approximately 50% on a resource is assigned an appropriate rating, such as "3." A workload that can expand approximately 25% on a resource is assigned an appropriate rating, such as "2." If any workload or resource constraints are violated in a placement, then the workload would be assigned an appropriate rating, such as "0." It should be appreciated that any headroom rating system can be employed that properly describes the robustness of workloads and resources.

At block 225, a consolidation recommendation of the plurality of workloads on the plurality of resources is automatically generated. The consolidation recommendation is based on an analysis of the historical data, plurality of workloads, plurality of available resources in the data center 100 and headroom ratings. The recommended consolidation provides a plurality of potential solutions of workloads placed on available resources. In one embodiment, the potential solutions are provided in an ordered resource list. In one embodiment, the recommendation provides for placement of workloads wherein the workload constraints do not exceed the resource constraints.

In one embodiment, there are a variety of potential solutions in order to maximize the chances of finding proper placement of workloads onto resources. In one embodiment, the consolidation recommendation employs the following resource orderings to maximize the chances of finding proper placement of workloads onto resources:

1. 25% of the time, the list is weighted toward resources configured with larger and more balanced CPU and memory capacities (penalizing the less-balanced systems).
2. 20% of the time, the list is weighted toward resources with larger CPU capacities compared to memory capacities.
3. 20% of the time, the list is weighted toward resources with larger memory capacities compared to CPU capacities.
4. 10% of the time, the list is weighted toward resources with greater network capacity compared to the balanced rating described in item 1.
5. 10% of the time, the list is weighted toward resources with greater disk capacity compared to the balanced rating described in item 1.
6. 10% of the time, the list is ordered randomly.
7. 5% of the time, the balanced order list described in item 1 is reversed.

In one embodiment, to improve the chance of finding proper placement of several workloads that are competing for a small availability of resources, workloads are placed immediately on a resource by varying the workload constraints, as described by the workload map described above. In another embodiment, workloads are immediately placed on a resource by varying the resource constraints, as determined by the resource map described above. For example, in one embodiment, workloads are immediately placed on a resource by varying the headroom ratings. In another embodiment, in half of the recommended consolidation solutions, a workload is immediately placed when the workload is down to two possible resource placements. In another embodiment, in 5% of the balanced ordered list solutions, as stated above in item 1, a workload is immediately placed when the workload is down to three possible resource placements. For instance, in one embodiment, the workloads are selected at random to reduce the chance that a workload will not be placed on an available resource. In one embodiment, the workloads are ordered by greatest resource consumption.

In one embodiment, the consolidation recommendation first recommends the placement of workloads on resources, when the workload constraints substantially equal but do not exceed the resource constraints. In another embodiment, a resource is placed at the head of the ordered list when the workload constraints substantially equal but do not exceed the resource constraints. In another embodiment, after the workload is placed on a resource, the next best resource is then selected from the head of the ordered resource list and workloads are consequently placed on the resource in an attempt to fill the resource near capacity. The process is repeated until either all the workloads are placed, or it is determined that a particular workload cannot be placed on any remaining resource.

In one embodiment, the consolidation recommendation employs a configurable threshold to declare when a resource should be considered "full." Once a resource is considered full, no additional workloads are to be placed on the resource. In another embodiment, the threshold variable can have a default value of 97.5%. In another embodiment, the default value can be in a range between 90% and 100%, depending on user configurations. For instance, in one embodiment, higher resource consolidation threshold values result in better consolidation; however, there could be additional runtime.

In one embodiment, if there are multiple solutions that have the same lowest cost, the solution that uses the fewest resources is chosen. In another embodiment, if more than one solution uses the same resource count, the solution with the highest headroom rating is chosen. In another embodiment, if more than one solution uses the same resource count, the solution with the lowest headroom rating is chosen. For example, in one embodiment, if more than one solution uses the same resource count, the solution is configurable by the end user(s).

Figure 3B:
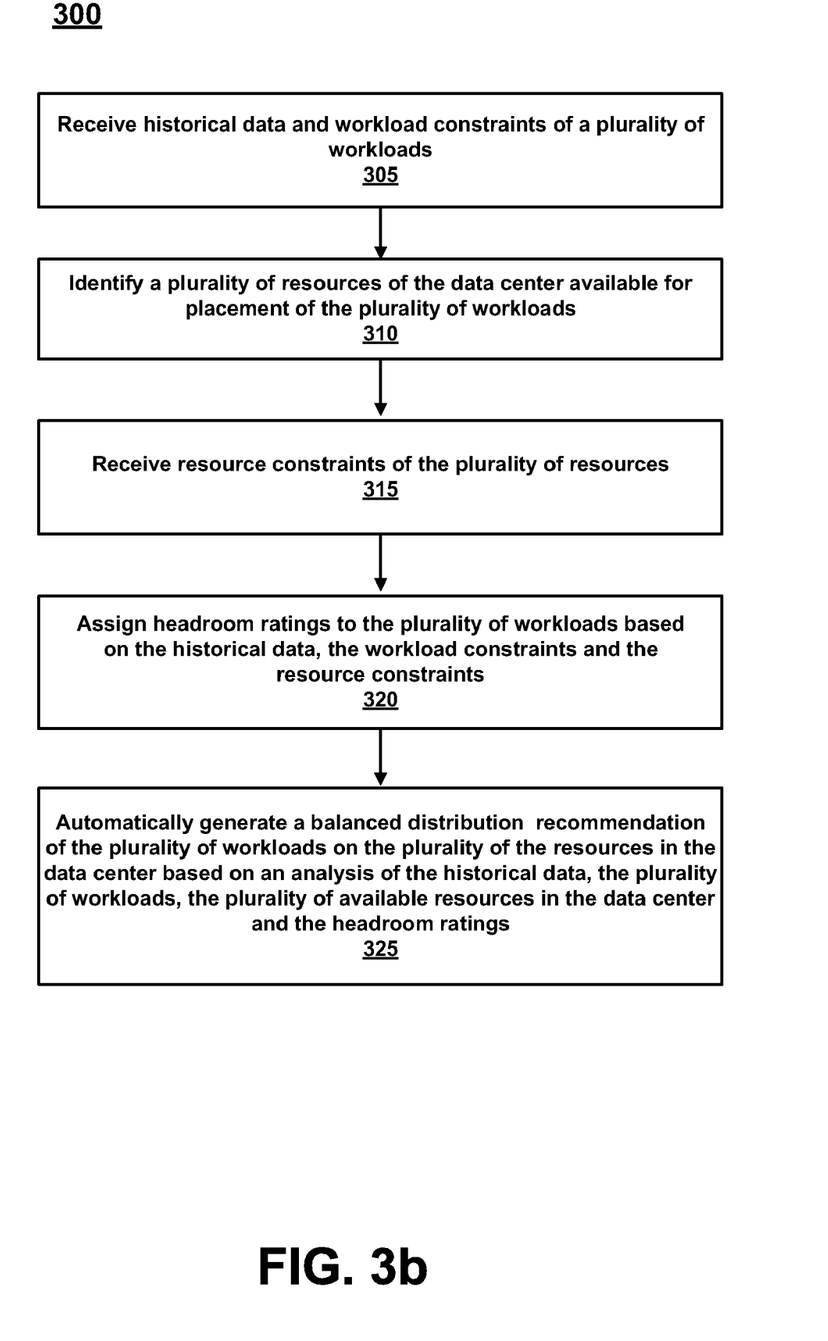
FIG. 3b illustrates a flowchart for automatically recommending load balancing workload placement in a data center, in accordance with an embodiment of the present invention.

FIG. 3b is a flowchart illustrating method 300 of automatically generating a balance distribution recommendation for the placement of workloads on resources in a data center. Although specific operations are disclosed in method 300, such steps are examples. That is, embodiments of the present invention are well-suited to performing various other operations or variations of the operations recited in method 300. The operations in method 300 may be performed in an order different than presented, and it is possible that not all of the operations in method 300 are performed. All of, or a portion of, the operations described by method 300 may be implemented using computer-readable and computer-executable instructions which reside, for example, in computer-usable media of a computer system. In one embodiment, process 300 is performed in a computer system, e.g., recommendation generator 170 of FIG. 1. It should be appreciated that various operations have been left out of the following discussion for purposes of brevity and clarity.

The goal of balanced workload distribution is to distribute workloads across resources such that the amount of available capacity on the resources after placement of the workloads is substantially equal without violating or exceeding any workload or resource constraints. In other words, the balanced distribution recommendation provides for placement of workloads on resources such that the difference between the resource constraints and workload constraints are substantially the same. Accordingly, headroom rating values (i.e., robustness of placement) is used to guide the search for ideal balanced distribution of workloads.

At block 305, historical data and workload constraints of a plurality of workloads are received. In one embodiment, the historical data is used to forecast the growth rate of a workload.

At block 310, a plurality of resources are identified which are available for placement of the plurality of workloads. FIG. 3a illustrates one embodiment of the implementation of the balanced distribution recommendation of a plurality of workloads on a plurality of resources 330-333 located in a data center (not shown). The plurality of resources 330-333 are shown having workloads currently placed on the resources before balanced distribution of the already placed workloads. After implementation of the balanced distribution recommendation, resources 330-333 are shown with a balanced distribution of workloads on the resources.

In one embodiment of FIG. 3a, workload and resource constraints can determine the balanced distribution of the workloads on the resources. For example, in one embodiment, workload 340 has a memory constraint of 15 GB and workload 341 has a memory constraint of 10 GB. Resource 330 has a memory constraint of 30 GB compared to 12 GB memory capacity constraints for resources 331-333. Only resource 330 is available to hold resources 340 and 341 when there is a balanced distribution of workloads. Similarly, workload 342 has a CPU constraint that is larger than the CPU constraint of resources 330, 332 and 331 therefore workload 342 could not be placed on any other resource and must remain on resource 331 because the CPU constraint would exceed and violate the CPU constraints of the other resources.

At block 315, resource constraints of the plurality of resources are received. In one embodiment, the resources are homogenous. In one embodiment, the resources are heterogeneous. In another embodiment, the resources are physical servers. In another embodiment, the resources are template-based what-if systems. For instance, in one embodiment, servers are converted into virtual machines with using existing virtual machine hosts. In another embodiment, servers are converted into virtual machines without using existing virtual machine hosts.

At block 320, headroom ratings are assigned to a plurality of workloads based on the received historical data, workload constraints and resource constraints. The headroom ratings describe the robustness of the workloads and resources. In other words, the ratings describe how much more room is available for workloads to grow on given resources.

At block 325, a balanced distribution recommendation of the plurality of workloads on the plurality of resources is automatically generated. The balanced distribution recommendation is based on an analysis of the historical data, plurality of workloads, plurality of available resources in the data center 100 and headroom ratings. The balanced distribution recommendation provides a plurality of potential solutions of workloads placed on available resources.

In one embodiment, for each resource constraint, the greatest capacity is determined across all available resources and subsequently used to create normalized resource capacity values. The capacity values allows for the balancing of workloads across all resources. For example, a resource with 8 GB memory capacity with 2 GB in use compares equally to a resource with 16 GB and 10 GB in use because they both have 6 GB of headroom.

In one embodiment, the balanced distribution recommendation first recommends the placement of any workload that is down to its last valid available resource for placement (e.g., when the headroom rating is very low, such as "1"). The balanced distribution recommendation then recommends a workload that is selected at random to be placed on a resource that has the greatest amount of capacity (e.g., when the headroom rating is very high, such as "5"). The process is continued until either all the workloads are placed or it is determined that a particular workload cannot be placed on any remaining resource. In another embodiment, the recommendation provides for placement of workloads on resources such that the difference between the resource constraints and workload constraints on a plurality of resources are substantially the same. In another embodiment, the recommendation provides for placement of a plurality of workloads on a plurality of resources without the workload constraints exceeding the resource constraints. For example, in one embodiment, the recommendation provides for the immediate placement of a workload when the workload constraint is substantially equal to and does not exceed the resource constraint of a resource such that the resource is the last available resource for placement.

In one embodiment, the objective of the balanced distribution recommendation is to achieve the highest average headroom rating with the least deviation. For example, two separate recommended solutions can both have three headroom ratings with the average of the headroom ratings being equal for each solution. A first recommended solution can have three varied headroom ratings (e.g., 3, 4 and 5) and a second recommended solution can have headroom ratings that are all equal (e.g., 4, 4 and 4). The second recommended solution is the more balanced of the two solutions because it has the lowest deviation. In one embodiment, the best recommended solution is determined by calculating the average and standard deviation for the highest headroom ratings across all resources, then selecting the solution with the highest average across less one standard deviation to identify the best workload placement on a resource.

Figure 4B:
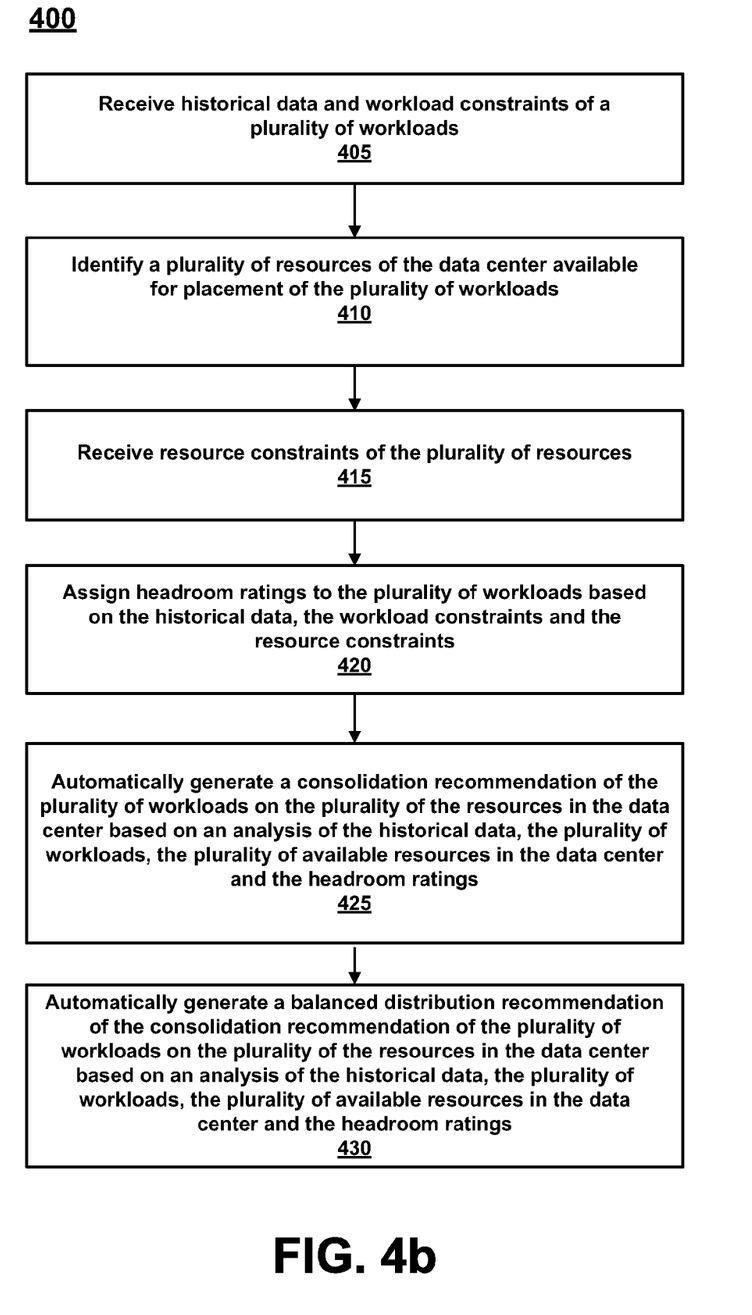
FIG. 4b illustrates a flowchart for automatically recommending consolidated and load balancing workload placement in a data center, in accordance with an embodiment of the present invention.

FIG. 4b is a flowchart illustrating method 400 of automatically generating a consolidation and balanced distribution for the placement of workloads on resources in a data center. Although specific operations are disclosed in method 400, such steps are examples. That is, embodiments of the present invention are well-suited to performing various other operations or variations of the operations recited in method 400. The operations in method 400 may be performed in an order different than presented, and it is possible that not all of the operations in method 400 are performed. All of, or a portion of, the operations described by method 400 may be implemented using computer-readable and computer-executable instructions which reside, for example, in computer-usable media of a computer system. In one embodiment, process 400 is performed in a computer system, e.g., recommendation generator 170 of FIG. 1. It should be appreciated that various operations have been left out of the following discussion for purposes of brevity and clarity. The goal of the consolidation and balanced distribution recommendation is to determine the required capacity for an aggregation of workloads in consideration for placement on a particular resource.

At block 405, historical data and workload constraints of a plurality of workloads are received. In one embodiment, the historical data is used to forecast the growth rate of a workload.

At block 410, a plurality of resources are identified which are available for placement of the plurality of workloads. FIG. 4a illustrates one embodiment of the implementation of the consolidation and balanced distribution recommendation of a plurality of workloads on a plurality of resources 430-433 located in a data center (not shown). The plurality of resources 430-433 are shown having workloads currently placed on the resources before consolidation and balanced distribution of the already placed workloads. After implementation of the consolidation and balanced distribution recommendation, resources 430-433 are shown with a consolidation and balanced distribution of workloads on the resources.

In one embodiment of FIG. 4a, workload and resource constraints can determine the balanced distribution of the workloads on the resources. For example, in one embodiment, workload 440 has a memory constraint of 15 GB and workload 441 has a memory constraint of 10 GB. Resource 430 has a memory constraint of 30 GB compared to 12 GB memory capacity constraints for resources 431-433. Only resource 430 is available to hold resources 340 and 341 when there is a consolidation and balanced distribution of workloads. Similarly, workload 442 has a CPU constraint that is larger than the CPU constraint of resources 430 and 431 therefore workload 442 could only be placed on resource resources 432 and 433. However, since the there is a consolidation of the workloads, workload 442 cannot remain on resource 433 and the only remaining resource with the available CPU capacity is resource 432. If resource 433 was the only resource with a CPU constraint greater than the CPU constraint of workload 442, then workload 442 would remain on resource 433.

At block 415, resource constraints of the plurality of resources are received. In one embodiment, the resources are homogenous. In another embodiment, the resources are heterogeneous. In one embodiment, the resources are physical servers. In another embodiment, the resources are template-based what-if systems. For instance, in another embodiment, servers are converted into virtual machines with using existing virtual machine hosts. In one embodiment, servers are converted into virtual machines without using existing virtual machine hosts.

At block 420, headroom ratings are assigned to a plurality of workloads based on the received historical data, workload constraints and resource constraints. The headroom ratings describe the robustness of the workloads and resources. In other words, the ratings describe how much more room is available for workloads to grow on given resources.

At block 425, a consolidation recommendation of the plurality of workloads on the plurality of resources is automatically generated. The consolidation recommendation is based on an analysis of the historical data, plurality of workloads, plurality of available resources in the data center 100 and headroom ratings. The consolidation recommendation provides a plurality of potential solutions of workloads placed on available resources. It should be appreciated that the consolidation recommendation can be done as described in FIG. 2b.

At block 430, a balanced distribution recommendation of the consolidation recommendation of block 425 is automatically generated. It should be appreciated that the balanced distribution can be done as described in FIG. 3b. In one embodiment, the balanced distribution is generated based on the analysis of the historical data, plurality of workloads, plurality of available resources and headroom ratings already provided from the consolidation recommendation. In another embodiment, the plurality of resources used by the consolidation recommendation may differ from the plurality of resources used by the balanced distribution recommendation.

In one embodiment, given an aggregate of workloads placed on a resource, the recommendation must determine the required capacity of the workloads by taking all workload and resource constraints into consideration. For example, Workload A requires 4 GB of memory and has a memory constraint that memory usage must not exceed 50% of available capacity. Workload B requires 8 GB of memory and has a memory constraint that memory usage not exceed 100%. Workloads A and B could be placed together on a resource that has at least 24 GB of memory, or the Workloads A and B could be placed separately on two resources with as little as 8 GB of memory each.

In one embodiment, in order to determine the required capacity for a collection of workloads, the recommendation first aggregates the historical data for all workloads related to all workload constraints, which produces one array of sample data for each of the constraints. The workload constraints are then combined and distilled. A binary search is employed varying the resource capacity for each constraint until a "required capacity" value is achieved that is within ½ to 1% of the actual required capacity. In one embodiment, the threshold for terminating the binary search is varied by the user(s). In one embodiment, the recommendation provides for placement of a plurality of workloads on a plurality of resources without the workload constraints exceeding the resource constraints.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for automatically recommending a consolidated workload placement in a data center, said method comprising:
   receiving historical data and workload constraints of a plurality of workloads;
   identifying a plurality of resources of said data center available for placement of said plurality of workloads;
   receiving resource constraints of said plurality of resources;
   assigning headroom ratings to said plurality of workloads based on said historical data, said workload constraints and said resource constraints, said headroom ratings describing how much more room is available for said plurality of workloads to grow on said plurality of resources;
   automatically generating a consolidation recommendation of said plurality of workloads on said plurality of said resources in said data center based on an analysis of said historical data, said plurality of workloads, said plurality of available resources in said data center and said headroom ratings;
   wherein said recommended consolidation provides an ordered list of said plurality of resources for the placement of said plurality of workloads on said plurality of resources, and a said resource of said plurality of resources is placed at the head of said ordered list when said resource constraint of said resource substantially equals and does not exceed any of said workload constraints of said plurality of workloads.

2. The method of claim 1, wherein said workload constraints comprises memory capacity, CPU capacity, network capacity and disk capacity.

3. The method of claim 1, wherein said resource constraints comprises memory capacity, CPU capacity, network capacity and disk capacity.

4. The method of claim 1, wherein said consolidation recommendation provides for placement of said plurality of workloads on as few of said plurality of resources as possible.

5. The method of claim 1, wherein said consolidation recommendation provides for placement of said plurality of workloads on said resources without said workload constraints exceeding said resource constraints.

6. The method of claim 1, wherein said workload constraints of said plurality of workloads or said resource constraints of said plurality of resources are varied to accommodate the immediate placement of said plurality of workloads on said plurality of resources.

7. The method of claim 1, wherein said recommended consolidation of said plurality of workloads further provides for a balanced distribution recommendation of said plurality of workloads.

8. A non-transitory computer readable medium storing instructions that when executed cause a computer system to automatically recommend a load balanced workload placement in a data center by:
   receiving historical data and workload constraints of a plurality of workloads;
   identifying a plurality of resources of said data center available for placement of said plurality of workloads;
   receiving resource constraints of said plurality of resources;
   assigning headroom ratings to said plurality of workloads based on said historical data, said workload constraints and said resource constraints, said headroom ratings describing how much more room is available for said plurality of workloads to grow on said plurality of resources;
   automatically generating a balanced distribution recommendation of said plurality of workloads on said plurality of said resources in said data center based on an analysis of said historical data, said plurality of workloads, said plurality of available resources in said data center and said headroom ratings;
   wherein said balanced distribution recommendation provides an ordered list of said plurality of resources for the placement of said plurality of workloads on said plurality of resources, and a said resource of said plurality of resources is placed at the head of said ordered list when said resource constraint of said resource substantially equals and does not exceed any of said workload constraints of said plurality of workloads.

9. The non-transitory computer readable medium of claim 8, wherein said workload constraints comprises memory capacity, CPU capacity, network capacity and disk capacity.

10. The non-transitory computer readable medium of claim 8, wherein said resource constraints comprises memory capacity, CPU capacity, network capacity and disk capacity.

11. The non-transitory computer readable medium of claim 8, wherein said balanced distribution recommendation provides for placement of said plurality of workloads on said plurality of resources such that the difference between said resource constraints of said plurality of resources and said workload constraints of said plurality of workloads placed on said plurality of resources are substantially the same.

12. The non-transitory computer readable medium of claim 8, wherein said balanced distribution recommendation provides for placement of said plurality of workloads on said resources without said workload constraints exceeding said resource constraints.

13. The non-transitory computer readable medium of claim 8, wherein said balanced distribution recommendation provides for the immediate placement of a said workload of said plurality of workloads when said workload constraint of said workload is substantially equal to and does not exceed a said resource constraint a said resource such that said resource is the last available said resource for placement.

14. The non-transitory computer readable medium of claim 8, wherein said balanced distribution recommendation further provides for a consolidation recommendation of said plurality of workloads.

15. A non-transitory computer readable medium storing instructions that when executed cause a computer system to automatically recommend a consolidation and load balanced workload placement in a data center by:
   receiving historical data and workload constraints of a plurality of workloads;
   identifying a plurality of resources of said data center available for placement of said plurality of workloads;

receiving resource constraints of said plurality of resources;

assigning headroom ratings to said plurality of workloads based on said historical data, said workload constraints and said resource constraints, said headroom ratings describing how much more room is available for said plurality of workloads to grow on said plurality of resources;

automatically generating a consolidation recommendation of said plurality of workloads on said plurality of said resources in said data center based on an analysis of said historical data, said plurality of workloads, said plurality of available resources in said data center and said headroom ratings;

automatically generating a balanced distribution recommendation of said consolidation recommendation of said plurality of workloads on said plurality of resources in said data center based on said analysis of said historical data, said plurality of workloads, said plurality of available resources in said data center and said headroom ratings;

wherein said recommended consolidation provides an ordered list of said plurality of resources for the placement of said plurality of workloads on said plurality of resources, and a said resource of said plurality of resources is placed at the head of said ordered list when said resource constraint of said resource substantially equals and does not exceed any of said workload constraints of said plurality of workloads.

16. The non-transitory computer readable medium of claim 15, wherein historical data regarding all workload constraints is aggregated.

17. The non-transitory computer readable medium of claim 15, wherein said consolidation recommendation and said balanced distribution recommendation provides for placement of said plurality of workloads on said resources without said workload constraints exceeding said resource constraints.

* * * * *